United States Patent [19]

Gersztenkorn

[11] Patent Number: 5,892,732
[45] Date of Patent: Apr. 6, 1999

[54] METHOD AND APPARATUS FOR SEISMIC SIGNAL PROCESSING AND EXPLORATION

[75] Inventor: Adam Gersztenkorn, Tulsa, Okla.

[73] Assignee: Amoco Corporation, Chicago, Ill.

[21] Appl. No.: 815,496

[22] Filed: Mar. 11, 1997

Related U.S. Application Data

[63] Continuation-in-part of Ser. No. 631,788, Apr. 12, 1996, abandoned.

[51] Int. Cl.$^6$ .............................. G06F 19/00; G01V 1/32; G01V 1/34
[52] U.S. Cl. ................................. 367/72; 367/59; 367/62
[58] Field of Search .................................. 367/591, 621, 367/72; 364/421

[56] References Cited

U.S. PATENT DOCUMENTS

| H374 | 11/1987 | Abo-Zena et al. | 342/378 |
|---|---|---|---|
| 3,981,443 | 9/1976 | Lynch et al. | 235/156 |
| 4,633,400 | 12/1986 | Chittineni | 364/421 |
| 4,858,199 | 8/1989 | Griffith | 367/45 |
| 4,894,795 | 1/1990 | Whitehouse et al. | 364/807 |
| 4,910,716 | 3/1990 | Kirlin | 367/24 |
| 4,937,747 | 6/1990 | Koller | 364/422 |
| 4,951,266 | 8/1990 | Hsu | 367/25 |
| 5,031,155 | 7/1991 | Hsu | 367/25 |
| 5,047,991 | 9/1991 | Hsu | 367/25 |
| 5,056,066 | 10/1991 | Howard | 367/72 |
| 5,175,710 | 12/1992 | Hutson | 367/135 |
| 5,253,192 | 10/1993 | Tufts | 364/726 |
| 5,260,911 | 11/1993 | Mason et al. | 367/57 |
| 5,379,268 | 1/1995 | Hutson | 367/100 |
| 5,563,949 | 10/1996 | Bahorich et al. | 364/421 |

FOREIGN PATENT DOCUMENTS 2139758  11/1984  United Kingdom .

OTHER PUBLICATIONS

"High–Resolution Velocity Spectra Using Eigenstructure Methods," Biondo Biondi and Clement Kostov, Stanford University, dated Oct. 30, 1988, *SEG Abstracts–88*, pp. 890–893, S 9.2.

"Signal–To–Noise Ratio Enhancement In Multichannel Seismic Data Via The Karhunen–Loeve Transform," I. F. Jones and S. Levy—*Geophysical Prospecting* 35, 12–32 1987 (incomplete, missing pp. 20–27.

"Application of the Karhunen–Loeve Transform To Diffraction Separation," Matthew J. Yedlin, Ian F. Jones, and B. Barry Narod, 8084 *I.E.E.E. Transactions on Acoustics, Speech & Signal Processing*, ASSP–35 (1987) Jan., No. 1, New York, NY USA.

"Fast Transform Eigenfunction Methods For Boundary Value Problems," *Geophys. J. R. Astr. Soc.* (1986) 86, 203–212, John A. Scales.

"Applications of the Karhunen–Loeve Transformation in Reflection Seismology" T. J. Ulrych, S. Levy, D. W. Oldenburg, and I. F. Jones, Univ. of British Columbia, Canada, S6.5 and 6.6, Society Of Exploration Geophysicists, Fifty–Third Annual International Meeting and Exposition, Expanded Abstracts Of The Technical Program With Authors' Biographies, Sep. 11–15, 1983/Las Vegas, Nevada.

"New Eigenfunction Expansions and Alternative Representations for the Reduced Wave Equation," Donald S. Cohen, *Journal of Mathematics and Mechanics*, vol. 14, No. 3 (1965).

(List continued on next page.)

*Primary Examiner*—Nelson Moskowitz
*Attorney, Agent, or Firm*—James A. Gabala; Thomas A. Yassen; Robert E. Sloat

[57] ABSTRACT

A method and apparatus for the exploration of hydrocarbons comprising the steps of: obtaining a set of seismic signal traces distributed over a predetermined three-dimensional volume of the earth; dividing the three-dimensional volume into a plurality of analysis cells having portions of at least two seismic traces located therein; computing outer products of the seismic traces within each cell; forming the covariance matrix for each cell from these outer products; computing the dominant eigenvalue and the sum of the eigenvalues of the covariance matrix of each cell and computing a seismic attribute from the ratio of the dominant eigenvalue to the sum of the eigenvalues of the covariance matrix of each cell; and forming map of the seismic attributes of selected groups of cells.

48 Claims, 13 Drawing Sheets

OTHER PUBLICATIONS

"Essal D'Une Application De La Transformation De Karhunen–Loeve Au Traitement Sismique," *Geophysical Prospecting* ISSN 0016–8025, vol. 26, No. 3, Sep. 1978; English Abstract Only.

"New Approach To Seismic–Reflection Event Detection And Velocity Determination" Scott C. Key and Scott B. Smithson, *Geophysics,* vol. 55, No. 8 (Aug. 1990); pp. 1057–1069, 12 Figs., 1 Table.

"Noise Elimination By The Use of Vector Resolution," Hongwei Wang, *Geophysics,* vol. 55, No. 9 (Sep. 1990); pp. 1191–1201, 10 Figs.

"Analysis Of Fault Traps," James C. Brenneke, Technical Manager, Subsurface Consultants & Associates, Inc., Houston, XP 000587362, *World Oil,* Dec. 1995 pp. 63–64, 67–68, and 70.

"Wave Separation And Feature Extraction Of Acoustic Well–Logging Waveforms Using Karhunen–Loeve Transformation," *Geophysics,* vol. 55, No. 2 (Feb. 1990); pp. 176–184, 7 Figs.

PRIOR ART FIG. 2

METHOD AND APPARATUS FOR SEISMIC SIGNAL PROCESSING AND EXPLORATION

CROSS-REFERENCE TO RELATED APPLICATIONS

This application is a continuation-in-part of a U.S. patent application having a Ser. No. of 08/631,788, filed on Apr. 12, 1996 and subsequently abandoned.

TECHNICAL FIELD

This invention relates to the general subject of seismic exploration and, in particular, to apparatus and methods for the exploration and production of oil and gas by identifying structural and stratigraphic features in three dimensions.

BACKGROUND OF THE INVENTION

In seismic exploration, seismic data is acquired along lines that consist of geophone arrays onshore or hydrophone streamer traverses offshore. Geophones and hydrophones act as sensors to receive energy that is transmitted into the ground and reflected back to the surface from subsurface rock interfaces. Energy is usually provided onshore by Vibroseis® vehicles which transmit pulses by shaking the ground at pre-determined intervals and frequencies on the surface. Offshore, airgun sources are usually used. Subtle changes in the energy returned to surface often reflect variations in the stratigraphic, structural and fluid contents of the reservoirs.

In performing three-dimensional (3-D) seismic exploration, the principle is similar, however, lines and arrays are more closely spaced to provide more detailed sub-surface coverage. With this high density coverage, extremely large volumes of digital data need to be recorded, stored and processed before final interpretation can be made. Processing requires extensive computer resources and complex software to enhance the signal received from the subsurface and to mute accompanying noise which masks the signal.

Once the data is processed, geophysical staff compile and interpret the 3-D seismic information in the form of a 3-D data cube (See FIG. 1) which effectively represents a display of subsurface features. Using this data cube, information can be displayed in various forms. Horizontal time slice maps can be made at selected depths (See FIG. 2). Using a computer workstation an interpreter can also slice through the field to investigate reservoir issues at different seismic horizons. Vertical slices or sections can also be made in any direction using seismic or well data. Time maps can be converted to depth to provide a structural interpretation at a specific level.

Seismic data has been traditionally acquired and processed for the purpose of imaging seismic reflections. However, changes in stratigraphy are often difficult to detect on traditional seismic displays due to the limited amount of information that stratigraphic features present in a cross-section view. Although such views provide an opportunity to see a much larger portion of these features, it is difficult to identify fault surfaces within a 3-D volume where no fault reflections have been recorded.

Coherence and semblence (a measure of multichannel coherence) are two measures of seismic trace similarity or dissimilarity. As two seismic traces increase in coherence, the more they are alike. Assigning a coherence measure on a scale from zero to one, "0" indicates the greatest lack of similarity, while a value of "1" indicates total or complete similarity (i.e., two identical traces). Coherence for more than two traces may be defined in a similar way.

One method for computing coherence was disclosed in a U.S. patent application (now U.S. Pat. No. 5,563,949) by Bahorich and Farmer (assigned to Amoco Corporation) having a Ser. No. of 08/353,934 and a filing date of Dec. 12, 1994. A method for computing semblance was disclosed in a U.S. patent application by Marfurt et. al. (assigned to Amoco Corporation) having an application Ser. No. of 60/005,032 and a filing date of Oct. 6, 1995. The Marfurt et al. invention included a brute force search over candidate dips and azimuths.

As good as both methods have proved to be, they have some limitations. Improved resolution and computational speed are always desirable.

SUMMARY OF THE INVENTION

In accordance with the present invention, a multitrace eigen-decomposition process is disclosed that is more robust and that has higher resolution than previously known methods. In one embodiment of the invention, a method is disclosed for the exploration of gas and oil. The method comprises the steps of: accessing a data set of seismic signal traces distributed over a pre-determined three-dimensional volume of the earth; in a running window determining the outer-product of at least two data vectors formed from at least two seismic traces; forming a covariance matrix by adding the outer-products; computing a seismic attribute that is a function of at least the dominant eigenvalue of the covariance matrix; and forming a map from the computed seismic attributes over at least a part of the pre-determined three dimensional volume of the earth.

In another embodiment of the invention, the process of the invention is encoded on a computer readable media (e.g., magnetic disk, magnetic tape, CD-ROM, etc.) for directing the operation of a computer to compute the seismic attributes. In other embodiments of the invention, a map is prepared from the above-described process and the map is used to locate oil and gas deposits.

This technique is particularly well suited for interpreting fault planes within a 3-D seismic volume and for detecting subtle stratigraphic features in 3-D. This is because seismic traces cut by a fault line generally have a different seismic character than seismic traces on either side of the fault. Measuring seismic trace similarity, (i.e., coherence or 3-D continuity) along a time slice reveals lineaments of low coherence along these fault lines. Such coherency values can reveal critical subsurface details that are not readily apparent on traditional seismic sections. Also by calculating coherence along a series of time slices, these fault lineaments identify fault planes or surfaces.

Numerous other advantages and features of the present invention will become readily apparent from the following detailed description of the invention, the embodiments described therein, from the claims, and from the accompanying drawings.

DETAILED DESCRIPTION

Figure 1:
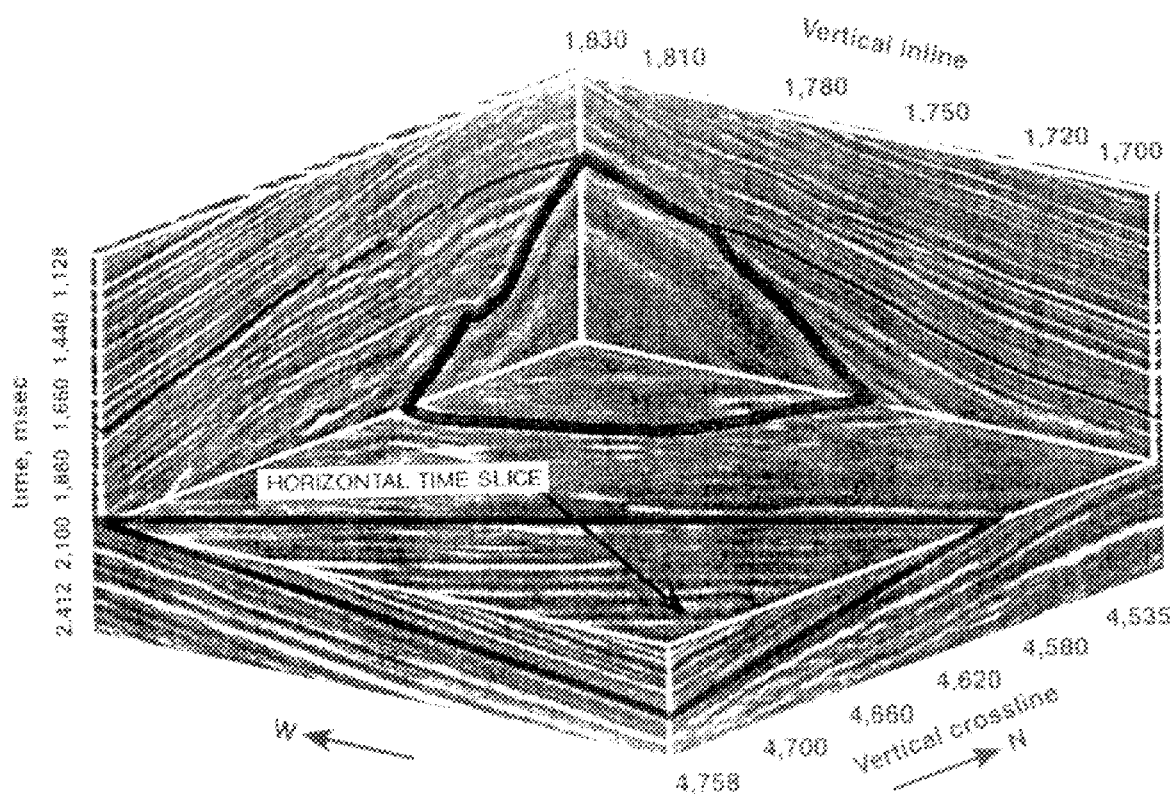
FIG. 1 is a pictorial representation of the information obtained from processing 3-D seismic data.
Figure 2:
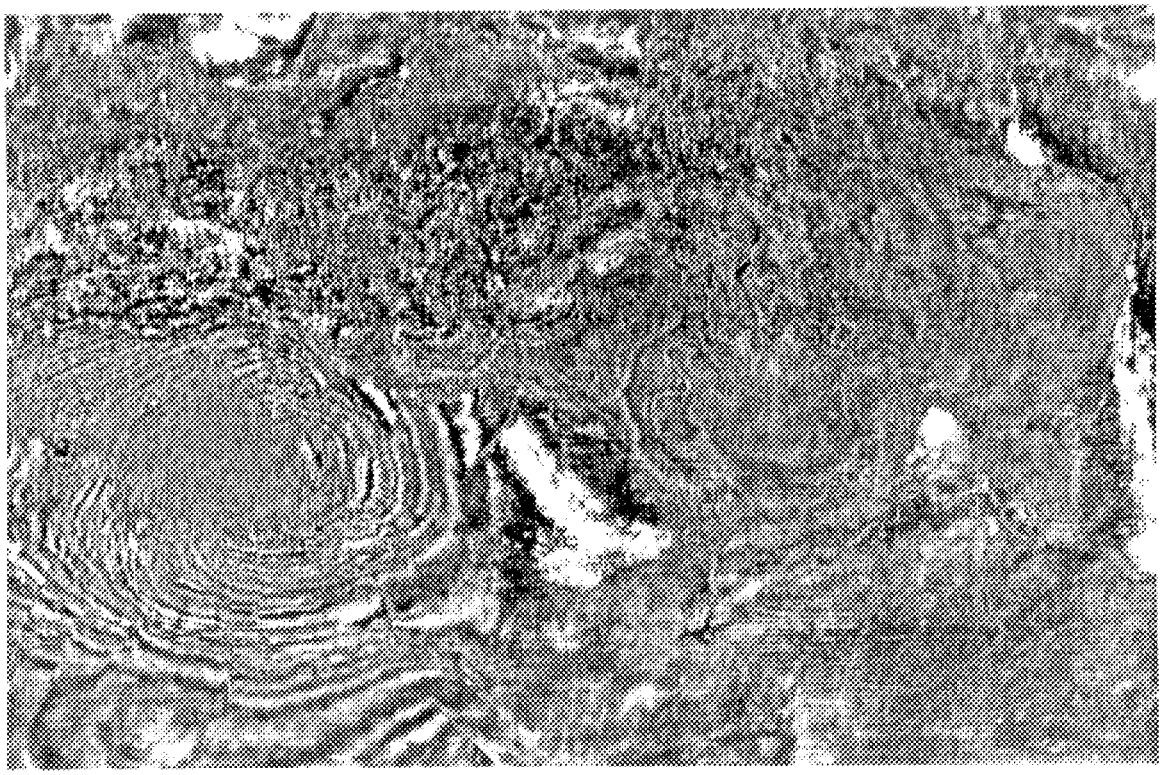
FIG. 2 is a pictorial representation of a horizontal time slice of 3-D seismic data processed in accordance with the prior art.

While this invention is susceptible of embodiment in many different forms, there is shown in the drawings, and will herein be described in detail, several specific embodiments of the invention. It should be understood, however, that the present disclosure is to be considered an exemplification of the principles of the invention and is not intended to limit the invention to the specific embodiments or algorithm so described.

Before describing the process of the invention, the underlying principle of operation will be described.

Figure 3:
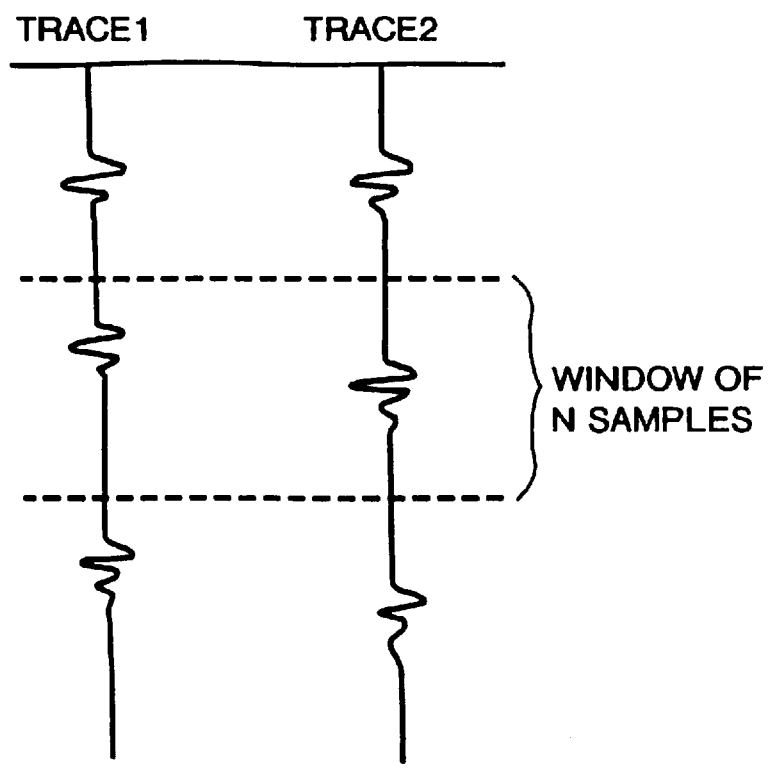
FIG. 3 is a drawing depicting two adjacent seismic traces.

Consider two traces $t_1$ and $t_2$ over a specified time window or depth window of N samples for which coherence is to be evaluated. A representative diagram of the traces and the relevant analysis window is shown in FIG. 3. The first trace $t_1$ consists of the time series $(t_{11}, t_{12}, \ldots, t_{1N})$ and the second trace $t_2$ consists of the time series $(t_{21}, t_{22}, \ldots, t_{2N})$. In these two time series, the first index refers to the trace number (i.e., trace 1 or trace 2), while the second index refers to the sample number.

Figure 4:
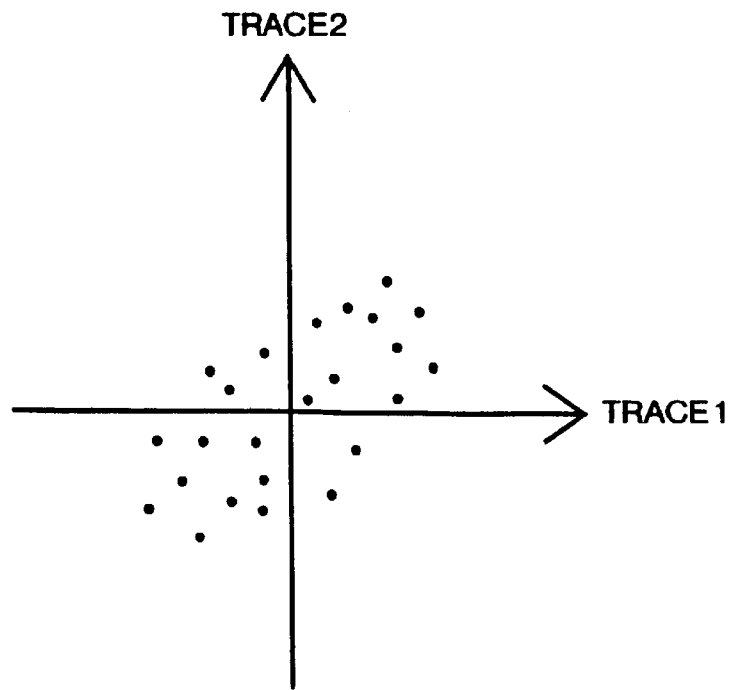
FIGS. 4 through 8 are schematic diagrams depicting the coherency of a pair of seismic traces in accordance with the present invention.

By plotting one trace against the other in the familiar two-dimensional Cartesian coordinate system a better understanding of the meaning of coherence in the context of the present invention can be obtained. Plotting equivalent time samples from the two traces [i.e., the point pairs $(t_{11}, t_{21})$, $(t_{12}, t_{22}), \ldots, (t_{1N}, t_{2N})$], produces a crossplot of the two time series. Letting the x-axis represent the first trace $t_1$ and the y-axis the second trace $t_2$, results in the diagram depicted in FIG. 4. It is the pattern formed by these points which manifests the coherence of the two traces.

Figure 5:
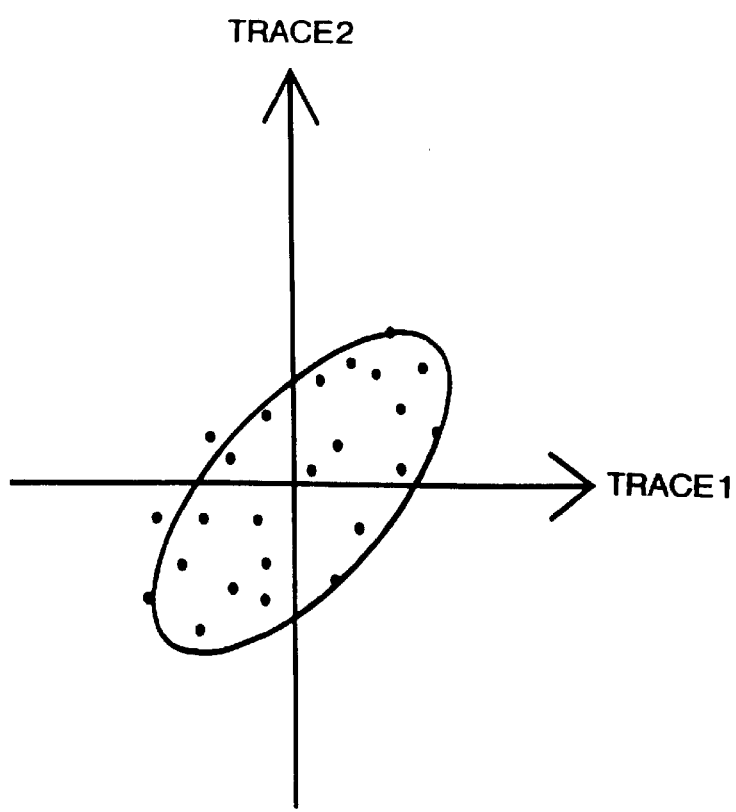

The general shape of these two correlated traces is a set of points represented by an ellipse. This ellipse is a generalization since it does not represent each individual point but rather describes the "overall" nature of all the points. The major and minor axes of this ellipse will be oriented in a direction which is determined by the geometry of the paired points. The lengths of the two axes are also determined by this geometry. A typical representation of these points and the corresponding ellipse is shown in FIG. 5.

The directions and magnitudes of the major and minor axes of the ellipse may be represented by two scaled vectors with the longer vector oriented along the major axis and the shorter vector along the minor axis. The magnitudes of the two vectors correspond to the two eigenvalues of the data covariance matrix and the normalized vectors correspond to the eigenvectors. The eigenvectors, scaled by their respective eigenvalues, denote the magnitudes and directions of the major and minor axes. The "principal component" corresponds to eigenvector which is associated with the dominant eigenvalue.

The figures that follow (FIGS. 6 through 8) are intended to give an intuitive understanding of the mechanics behind the previous discussion. In these figures, traces are constructed using simple amplitude and phase variations, and the effect of these variations is observed on the associated eigenvalues and eigenvectors.

Figure 6A:
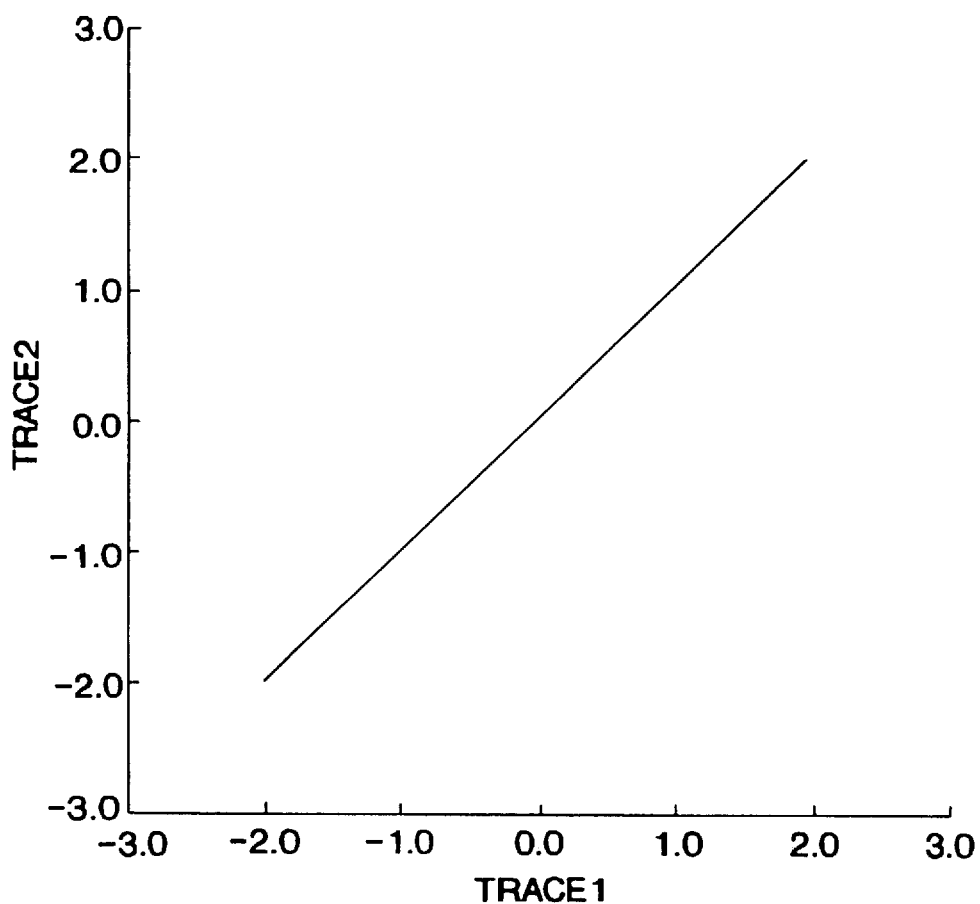
Figure 6B:
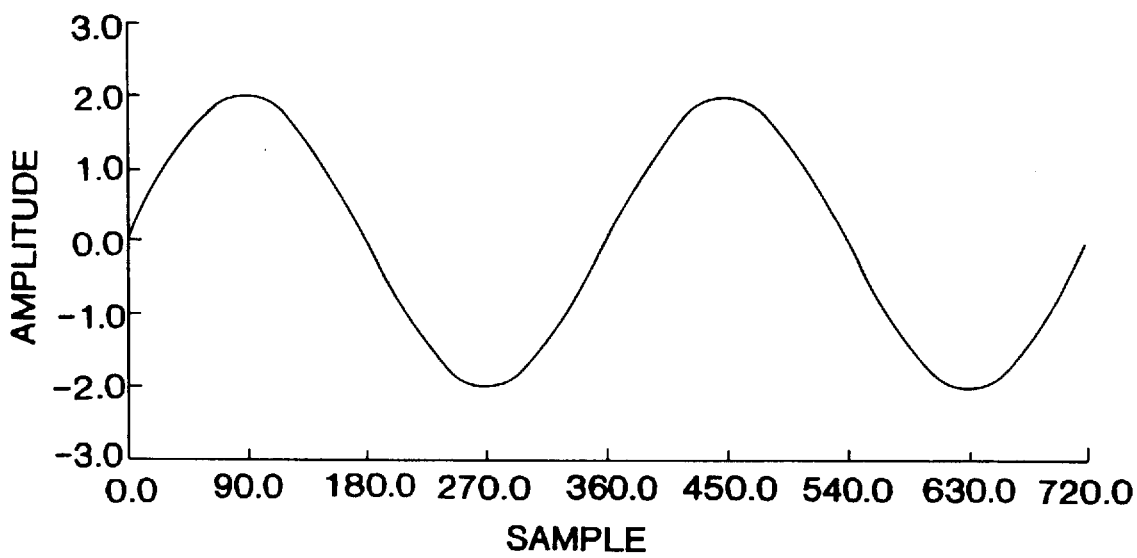

FIG. 6 demonstrates how two identical traces degenerate to a 45 degree line, (i.e., an ellipse with the minor axis collapsed to zero). The "zero length" indicates that the second eigenvalue is "zero" and indicates that the eigenvector corresponding to the dominant eigenvalue is aligned with the major axis. The coherence is maximum, with a value of one.

Figure 7A:
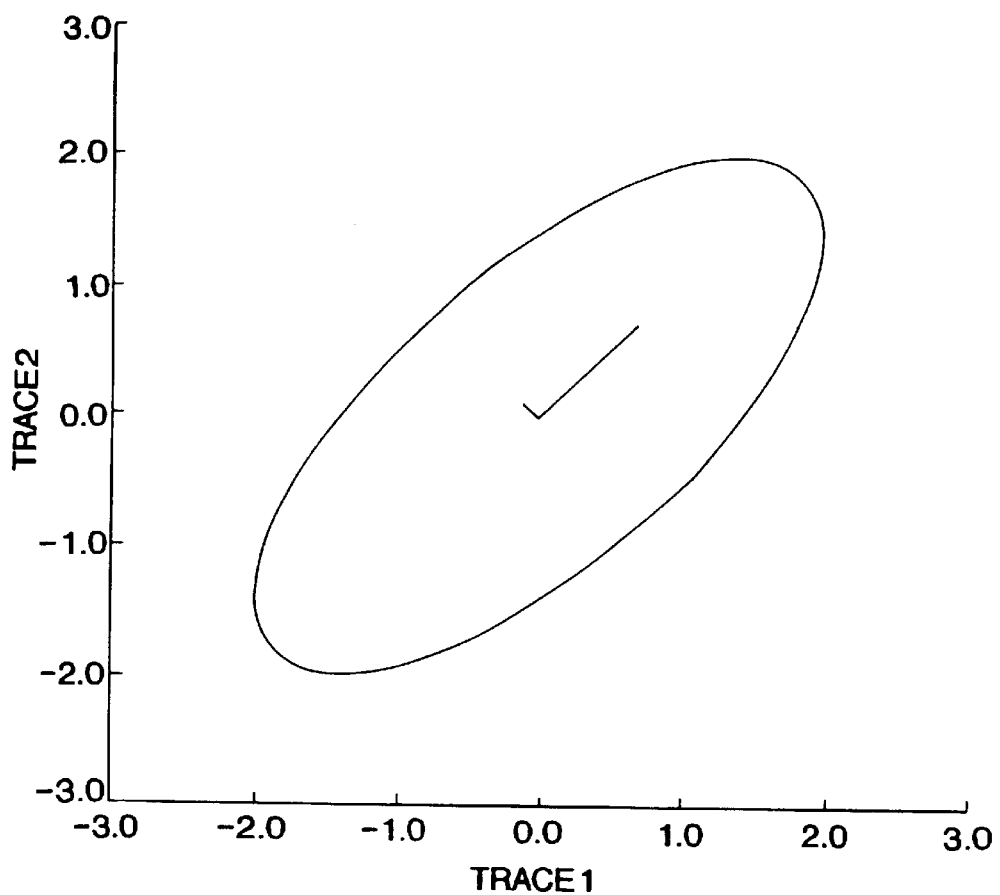
Figure 7B:
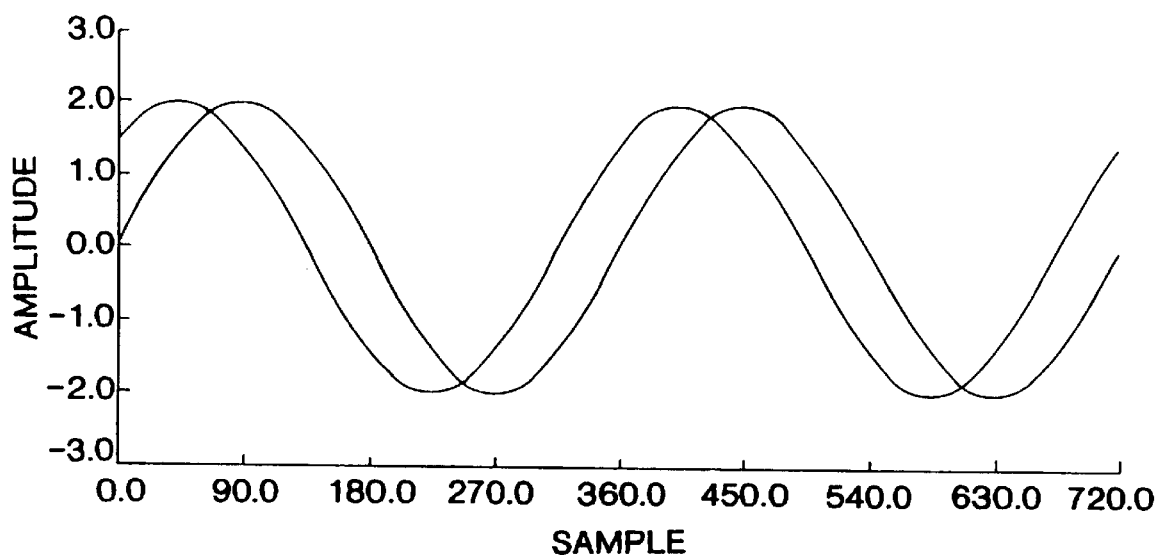

The situation for two traces having equal amplitudes and a 45 degree phase difference is shown in FIG. 7. This demonstrates how a phase shift lengthens the minor axis and therefore increases the magnitude of the second eigenvalue. The two eigenvectors scaled by their respective eigenvalues are also shown. Due to the difference in these traces, the coherence is reduced to a value of less than one.

Figure 8A:
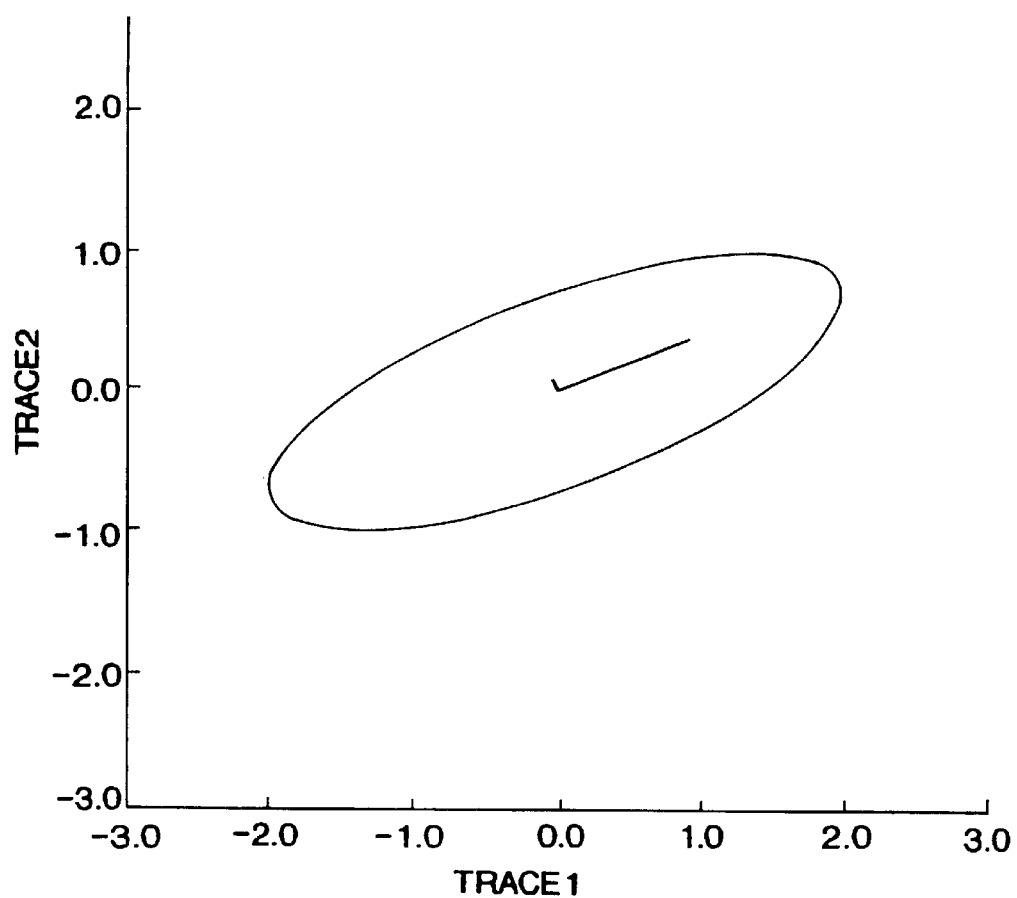
Figure 8B:
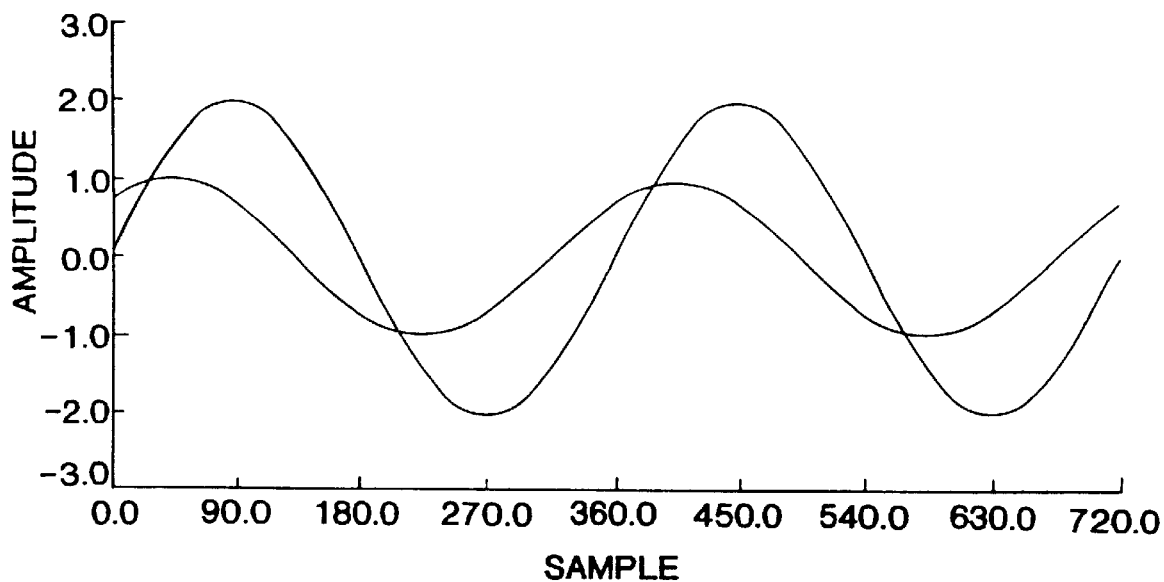

Finally, in FIG. 8 both the phase and amplitude are allowed to vary. The two traces have both a 45 degree phase shift and a 2 to 1 amplitude ratio. The resulting ellipse has a nonzero minor axis (the second eigenvalue is nonzero), reflecting the phase difference. In addition, the ellipse and eigenvectors are rotated due to the amplitude difference. Again, the amplitude and phase variations produce a reduction in coherence.

The main point of the forgoing discussion is to show heuristically that coherence can be expressed as a function of the eigenvalues, $\lambda_1$ and $\lambda_2$, and the eigenvectors $v_1$ and $v_2$. Functionally, an expression for coherence is:

$$\text{Coherence} = f(\lambda_1, \lambda_2, v_1, v_2). \quad (1)$$

This procedure for two traces can easily be extended to any desired number of traces. From a practical standpoint, the computational burden increases with an increasing number of traces and limitations are imposed only by the available computing power. For a 3-D seismic data set, this analysis can be repeated over a moving or running analysis window in space and time (or space and depth), resulting in a measure of coherence at the center of the moving window. The output is a 3-D data set consisting of coherence values defined over the original data volume.

It will become apparent from the following discussion that one advantage of this process is that different aspects of the data are distributed among the eigenvalues and the eigenvectors. Information, such as amplitude and phase, can now be analyzed and dealt with in a robust and rigorous way. Resolution, for example, can be improved by manipulating the eigenvalues and eigenvectors. The benefits can be observed visually in the computed coherence slices. Another important aspect of coherence values in accordance with the present invention is that they exhibit sensitivity to discontinuities in the original data and reveal subtle geological features, such as faults and channels.

Returning to the process of the present invention, the first step is to obtain or access a set of three dimensional seismic data. Such data is in the form of seismic signal traces distributed over a three dimensional volume of the earth. Methods by which such data is obtained and reduced to digital form for processing as 3-D seismic data are well known to those skilled in the art. Such data is routinely acquired by geophysical vendors who specialize in land surveys or ocean surveys. Such data is also sold or licensed by vendors and is generally conveyed or stored on magnetic tape for transfer into the memory of a seismic work station.

Figure 9A:
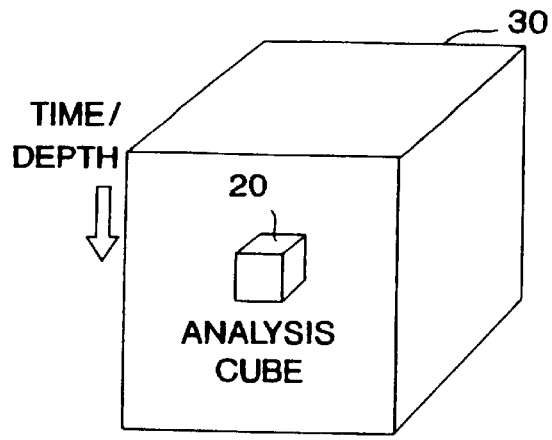
FIG. 9 is a pictorial representation of a running window analysis cube.
Figure 9B:
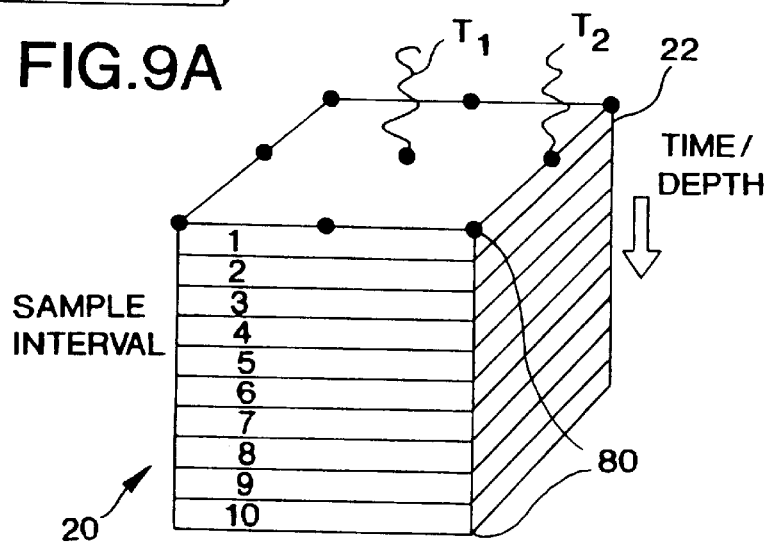

The next step is to divide the 3-D data set into a plurality of cells or analysis cubes 20 (See FIG. 9). These cubes 20 perform the function of dividing or sorting the seismic data into groups or cells for further processing. In effect, one analysis cube sweeps through the entire seismic data set or 3D data cube 30. Each analysis cube 20 comprises a stack of generally flat rectangular time layers 22.

For the purpose of simplicity, the 3-D data cube 30, the analysis cube 20, and the time layers 22 are shown in the form of right-angled parallelepipeds or cubes (generically a "cell"). Those skilled in the art will appreciate the simplicity of rectangular geometry in performing repetitive operations over 3-D data set. Other geometry and cell shapes are possible and may be warranted under the circumstances.

Figure 10A:
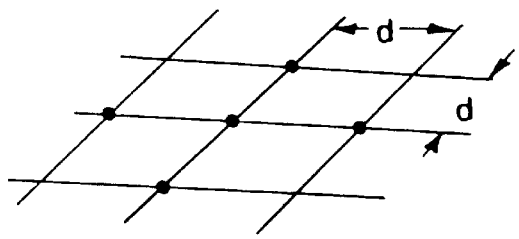
FIGS. 10A, 10B and 10C are schematic diagrams of groups of seismic traces.
Figure 10B:
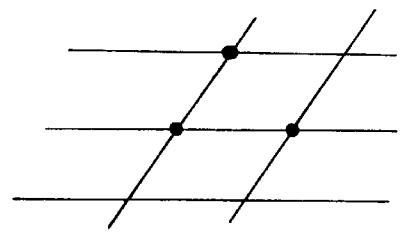
Figure 10C:
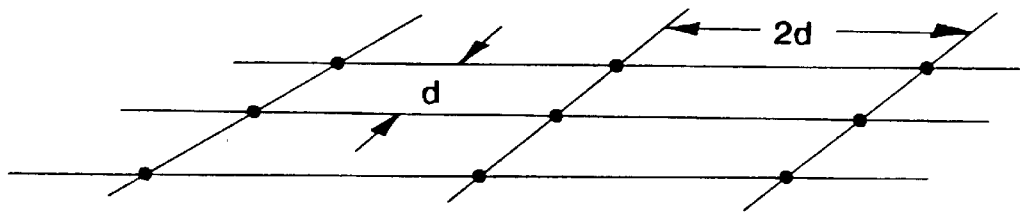

Returning to FIG. 10, each time layer 22 or slab has portions of seismic traces $t_1$ (only one being shown to avoid cluttering the drawings) passing therethrough. Nine traces, laid out in a 3 by 3 evenly spaced grid are depicted in FIG. 9. Five traces in a star pattern (See FIG. 10A) or three traces (See FIG. 10B) may be used. A symmetric arrangement is preferred. Nine traces in each time layer are often better than three traces. Two traces are the least that can be used.

Figure 11A:
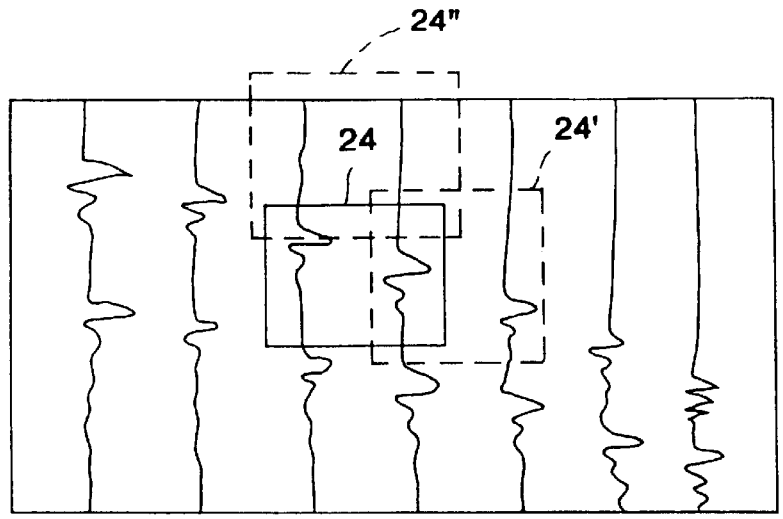
FIGS. 11A, 11B and 11C are schematic diagrams of two dimensional analysis windows.
Figure 11B:
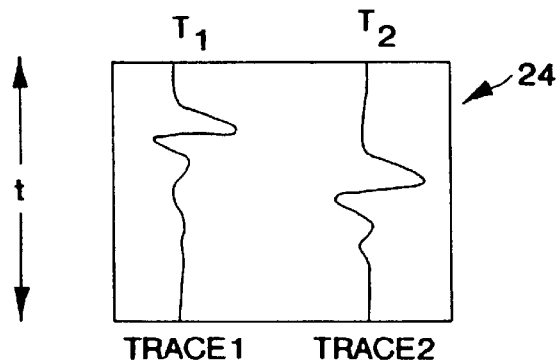

To help visualize the concept of the invention, the reader is referred to FIGS. 11A and 11B. In particular, it is often difficult to visualize these concepts in nine dimensions (as is the case of 9 traces). In FIGS. 11A and 11B, a two dimensional running window 24 (or analysis window) is shown with just two traces $t_1$ and $t_2$ contained therein. Each trace (See FIG. 11C) comprises a time series of N samples $$t_1=(t_{11}, t_{12}, \ldots, t_{1N})$$
$$t_2=(t_{21}, t_{22}, \ldots, t_{2N})$$

Figure 11C:
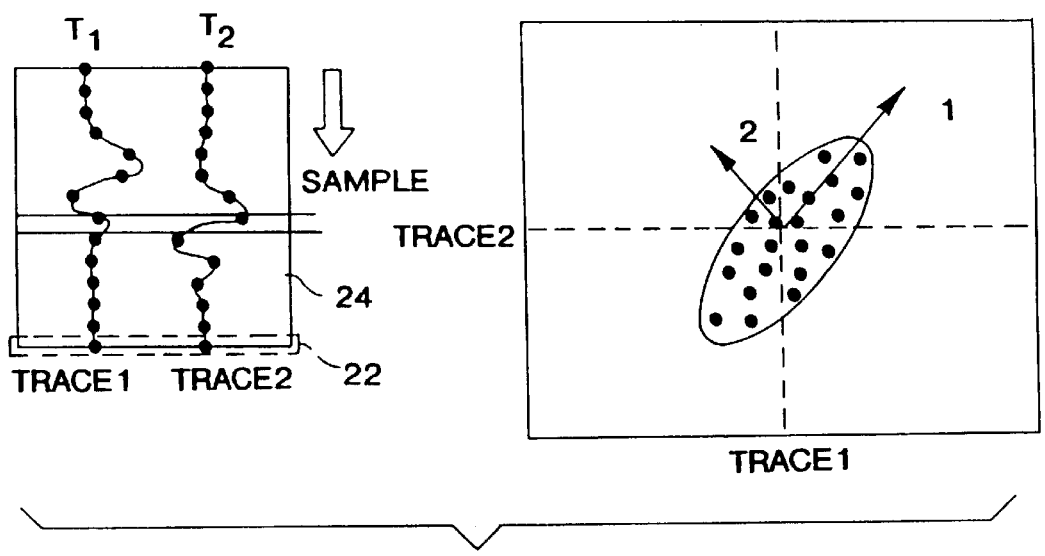

The analysis window 24 of FIG. 11C is further divided into a plurality of vertically stacked, rectangular time layers 22.

Before proceeding, it should be understood that, in choosing window size and spacing, there is a tradeoff between resolution and stability. In other words, small analysis windows or cubes allow higher spatial or temporal frequency in the resulting parameter estimate, but give less statistical stability or fewer degrees of freedom to those estimates. On the other hand, very large windows have poor resolution and tend to smear the data such that important geologic features may be lost.

Returning to FIG. 11C, the data points within each time layer 22 define seismic data vectors (here a 1 by 2 matrix, where N=2). As such, the two dimensional time layers of FIG. 11C (or the three dimensional time layer of FIG. 9) form or define vector windows. Thus, nine traces (N=9) will result in a data vector having nine elements.

The outer product of the data vector within each vector window or time layer 22 results in a N by N matrix. So a nine element data vector gives rise to a 9 by 9 matrix. Adding these matricies (one matrix for each vector window) results in a N by N covariance matrix for the entire analysis window 24 (or the analysis cube 20). So if the analysis cube comprises nine time layers, nine N by N matricies are added together to form one N by N covariance matrix.

In accordance with the present invention, a very useful and non-obvious measure of trace coherency is obtained by computing the eigenvalues of the covariance matrix. In particular, the largest or dominant eigenvalue of the covariance matrix and the sum of the eigenvalues of the covariance matrix are computed. The ratio of these two numbers represents the size of the dominant eigenvalue relative to the sum of eigenvalues. It also indicates the variability of traces within the analysis cube. Expressed mathematically, a useful seismic attribute is represented by:

$$\frac{\lambda_1}{\sum_{i=1}^{N} \lambda_i} = \psi \quad (2)$$

where $\lambda_i$ are the eigenvalues of the covariance matrix, and $\lambda_1$ is the dominant eigenvalue. As such, $\Psi$ is an indication of how well the point elements of the seismic data vectors are correlated (See FIGS. 4 and 5).

Each and every eigenvalue of the respective covariance matrix need not be expressly calculated. Those skilled in the art know that methods exist for calculating just the dominant eigenvalue (e.g., the power method, the Rayleigh quotient, [the faster of the two], etc.). Moreover, it is also known that the sum of the diagonal elements of the covariance matrix is equal to the sum of the eigenvalues of that covariance matrix. For convenience, the ratio (i.e., a measure of coherency) of equation (2) can be assigned to the center of the analysis cube 20 or the analysis window 22. It should be appreciated that one advantage of using the dominant eigenvalue is that it tends to more directly show the variability of the traces within the analysis window. The dominant eigenvector would not be a measure of the variability (i.e., the coherence).

In performing this measure of coherency, the analysis cube 20 or analysis window 22 effectively sweeps (i.e., laterally and vertically) accross the entire 3-D volume of FIG. 9 or all the traces of FIG. 11A. Preferably, adjacent analysis cubes 20 or vector windows 22 overlap one another (See windows 24, 24' and 24" of FIG. 11A). Overlap improves spatial resolution.

The result of the analysis cube 20 sweeping over the entire 3D data volume 30 and the assignment of the coherency measure of equation (2) is an array of coherency values assigned along each trace at the location of each data vector. As such, the 3D data volume is converted into a 3D "coherency cube."

The data or coherency measures contained within the coherency cube is most conveniently interpreted by displaying the coherency data in the form of a seismic attribute map. Such a map is most often in the form of a display of those coherency values lying along a surface passing through the coherency cube. Two examples are a flat plane passing through a common horizontal time slice, and a curved surface passing through a seismic horizon line selected by a seismic interpreter. Another example is a line representative of geologic depositional time so as to capture features from the same geologic age.

The coherency values are easily displayed for interpretation when displayed as a shade of gray (e.g., white indicating the highest coherency and black indicating the lowest coherency) or another color scale. (See U.S. Pat. No. 4,970, 699 for a "Method for Color Mapping Geophysical Data").

Landmark and GeoQuest interpretive workstations, for example, can be used to view and interpret faults and stratigraphic features by loading the coherency cube as a seismic volume. Such workstations are commonly used by those skilled in the art. Unprocessed 3D seismic data can be conveniently loaded onto the workstation by means of a magnetic tape or disk which is encoded with instructions for the computer to perform the above-described process. Visualization software (e.g., Landmarks's SeisCube software) may be employed to rapidly slice through the coherency cube to aid in understanding complex fault relationships. Coherency displays, including printouts in the form of seismic attribute maps, can reduce interpretation cycle time when used in selecting which seismic lines to interpret, enabling the interpreter to work around poor data areas. In addition, subtle stratigraphic features and complex faulting, which are not readily apparent on traditional seismic displays, can be rapidly identified and interpreted.

Figure 13A:
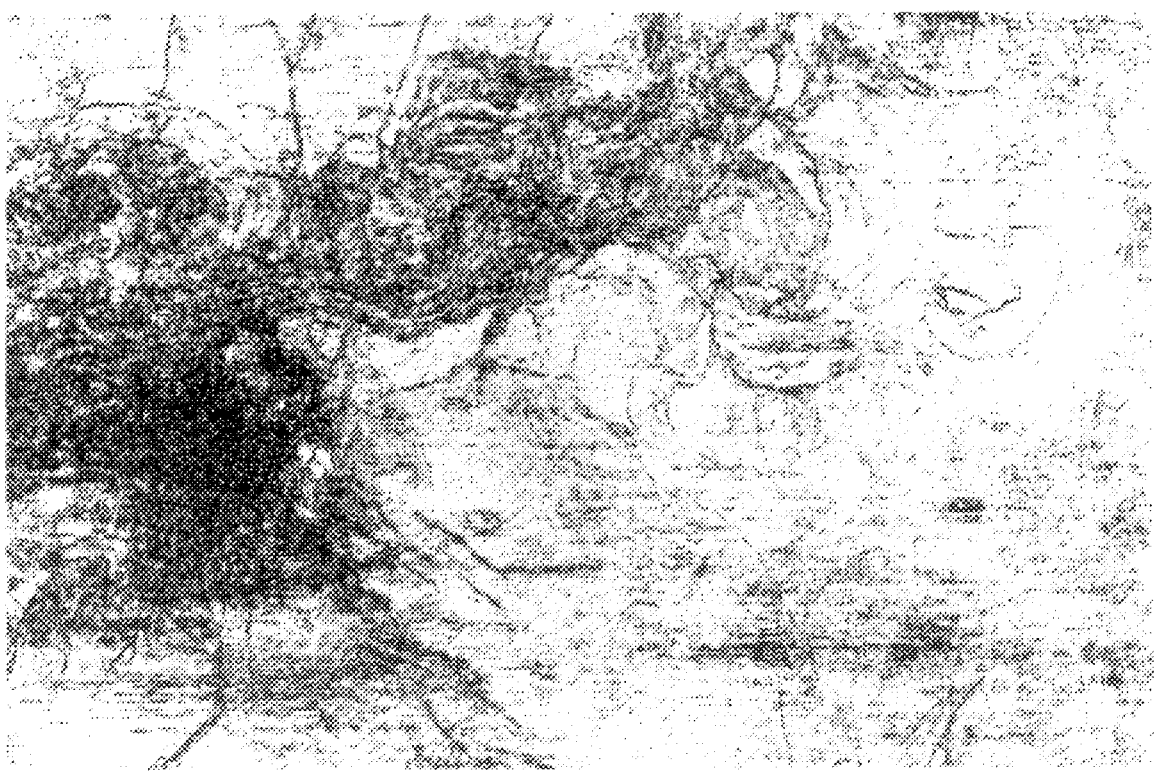
FIGS. 13A, 13B and 13C are pictorial representations of the same horizontal time slice in accordance with the inventions of Bahorich et al., Marfurt et al. and the present invention.
Figure 13B:
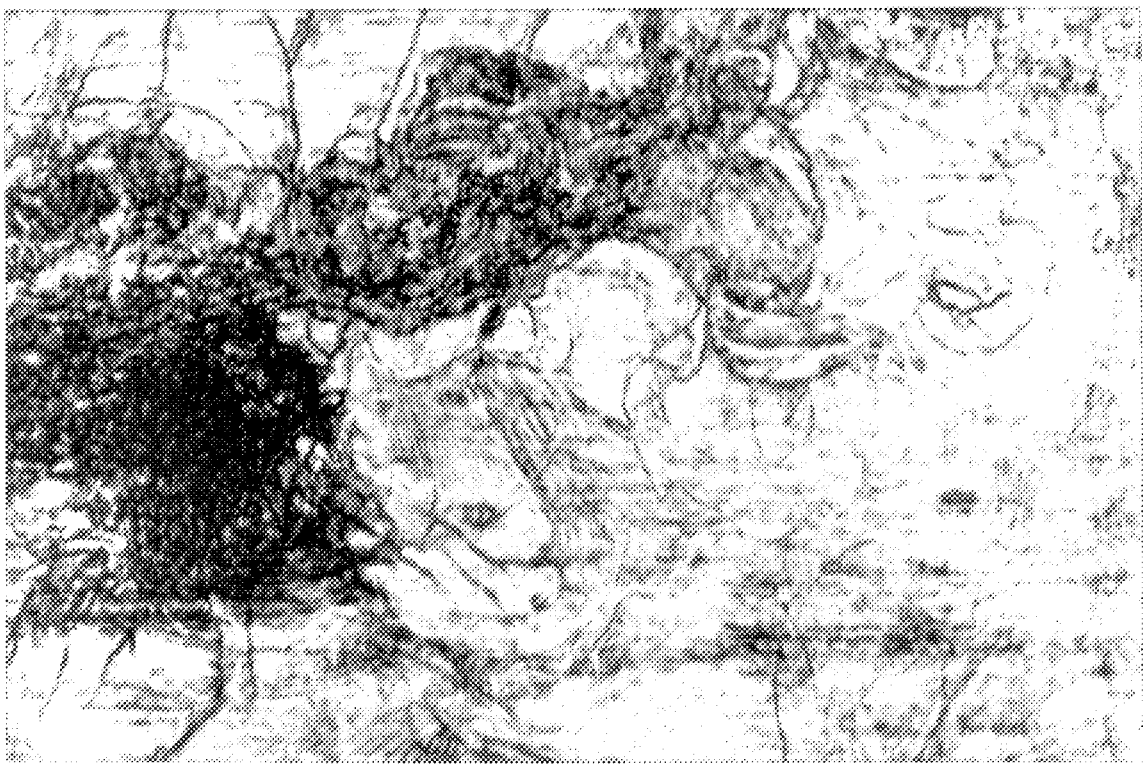
Figure 13C:
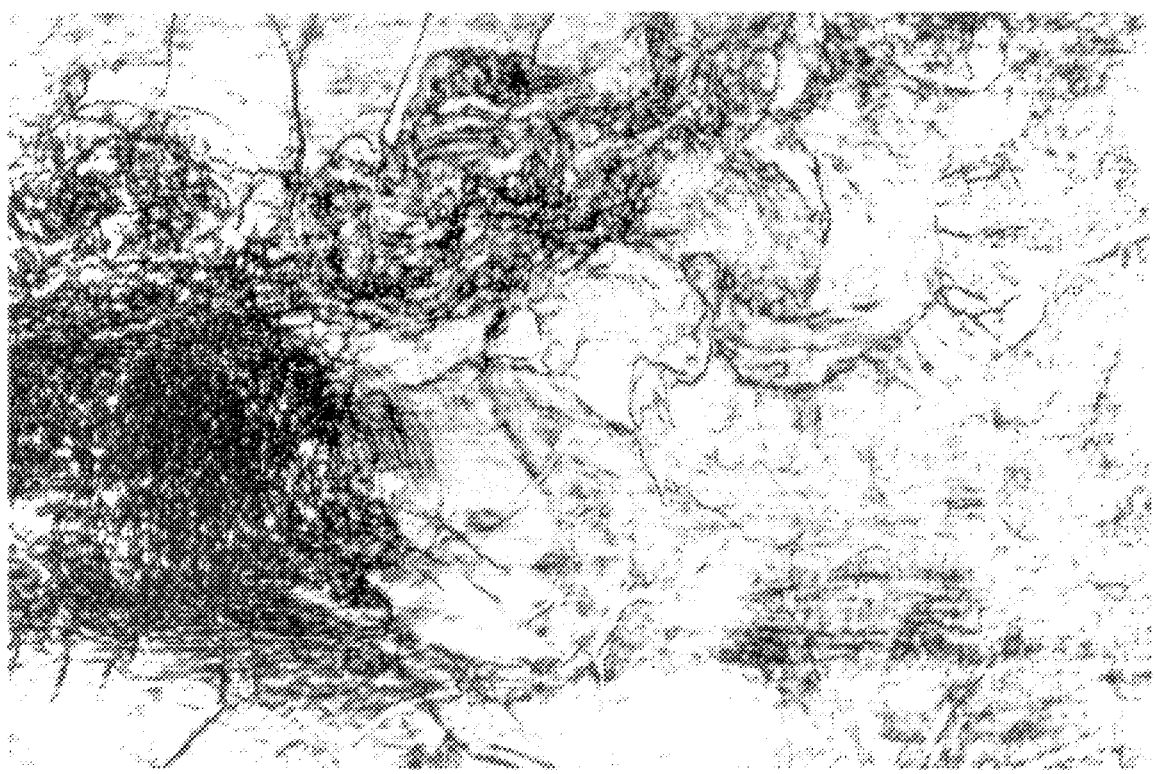

FIGS. 13A, 13B and 13C provide comparisons of the same seismic information displayed and processed by other processes and in accordance with the present invention. The differences are readily apparent.

Of course, the process of the invention is most conveniently carried out by writing a computer program to carry out the steps just described. Such processes are routinely carried out on work stations previously identified.

Figure 12:
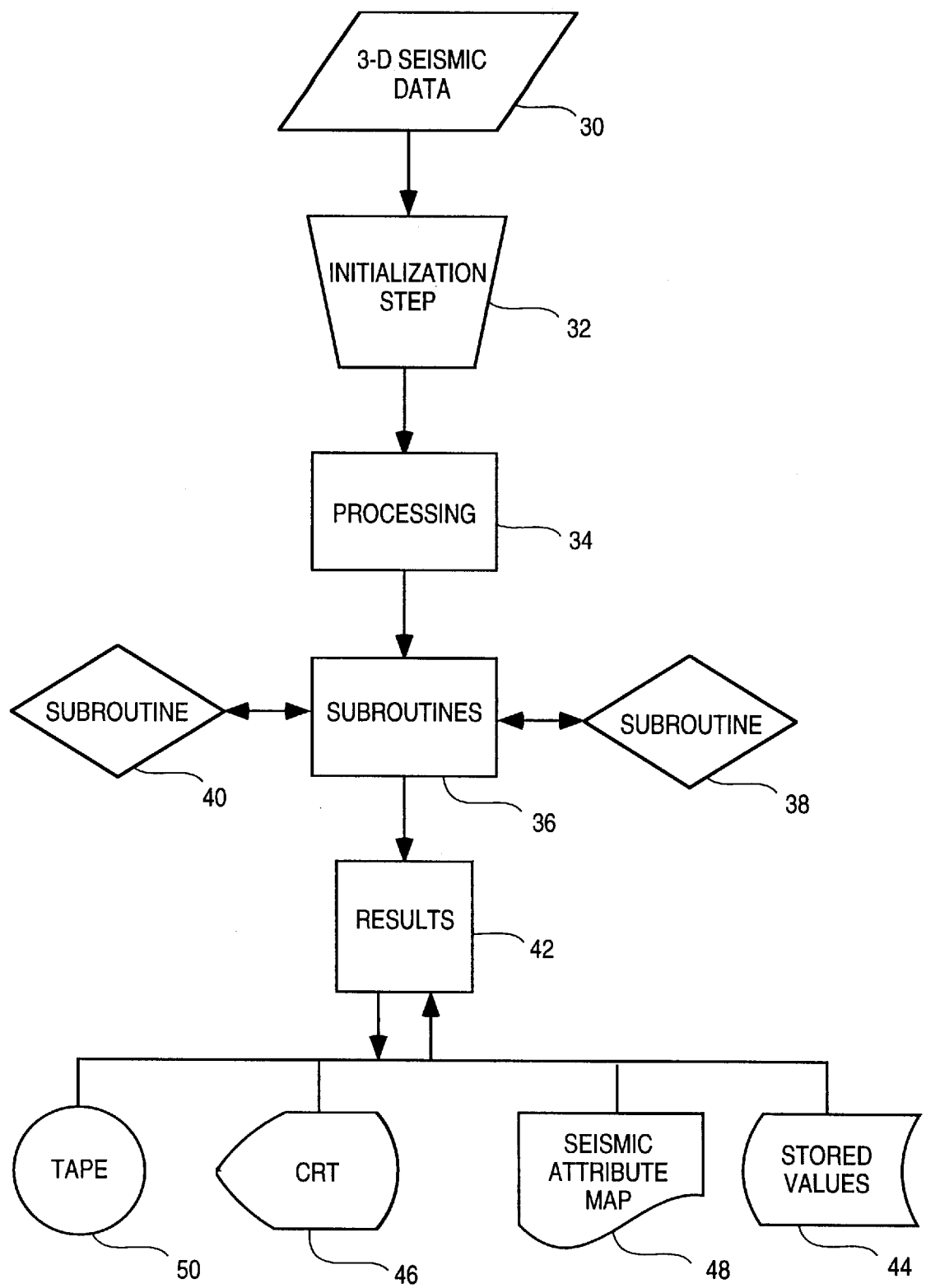
FIG. 12 is an elementary process flow diagram.

An elementary process flow diagram is illustrated in FIG. 12. In one embodiment of the invention, a software program is written in FORTRAN 77 to perform the process just described. 3-D seismic data 30 is read into memory. Based on the size and content of the available seismic data, an initialization step 32 is performed, program parameters are initialized, data ranges are established, preliminary checks are made, and window sizes are set. Defaults are read or user selected options are read. Next processing 34 is begun. In particular, subroutines 36 are called to sweep the data volume with an analysis cube. Within each analysis cube, a subroutine 38 computes the covariance matrix, and another subroutine 40 computes the dominant eigenvalues, the sum of the eigenvalues and the resultant coherency value. Finally, the results are combined 42 and the computed values are stored 44 in the form of a coherency cube. Thereafter, a workstation operator can access the coherency cube to display selected portions (e.g., time slice through the cube) on a CRT 46, to create a printout or seismic attribute map 48, to perform further analysis or to transfer to memory or to a tape 50 for further processing elsewhere.

Those skilled in the art are cautioned to use the method of the invention with due regard to what is known about the stratigraphy and geology of the region covered by the 3-D survey.

Coherency maps have been run on several 3-D surveys. At depths of reasonable data quality, approximately 90% of the faults can be readily identified. Faults were identified on coherency maps which were very subtle on seismic sections, but clearly present on the coherency maps because of the robustness of the method and the map perspective of fault patterns. Since coherency maps can be run on uninterpreted time slices, the present invention offers a means to greatly accelerate mapping of the structural framework and to reveal details of fault relationships which would otherwise be interpreted only through tedious fault picking.

Specific Examples

Coherence maps were generated along picked horizons and clearly identified salt/shale diapirs offshore.

In other locations mud and gas volcanos were clearly indicated using the process of the invention.

Several coherence time slices showed remarkable details of stratigraphic features, such as abandoned river channels, mud flows, point bars and submarine canyons. On seismic sections, these features were sometimes apparent but, in some cases, were unidentifiable even with close scrutiny.

This invention, like that of Bahorich et al. and Marfurt et al., provides a method of revealing fault planes within a 3-D volume where no fault reflections have been recorded. Faults are often critical to the accumulation of oil. A fault may form a seal by cutting off a structural or stratigraphic feature so the oil is trapped against the fault. On the other hand, if the fault plane contains rubble that has not been cemented, it may form a conduit for fluids. This may allow the hydrocarbons to drift up the fault plane into the feature and be trapped in it or to escape from the feature by drifting up the fault plane out of it. Thus, fault lines can predict flow patterns in a reservoir and communication between injector and producing wells, for example.

Seismic discontinuities can also provide the needed link to enable reservoir prediction between the wells and establish reservoir continuity and flow patterns across a field. Coherency technology can be used for finding, identifying and mapping of subsurface structural and sedimentological features such as faults, salt diapirs, unconformities, channel systems, karsting and carbonate reef facies which are commonly associated with the entrapment and storage of hydrocarbons. Therefore, this technology aids in the finding, extraction and production of hydrocarbons. In addition, it is used for identifying both shallow and deep drilling hazards (e.g., places where there is gas that is too close to the surface or where there are instabilities). Still another example is the use of the invention to search for leakage paths from known reservoirs or underground storage caverns.

Coherency mapping of 3-D seismic is an extremely powerful and efficient tool for mapping both structure and stratigraphy. The new method is particularly sensitive to any lateral variation in wavelet character and therefore is particularly sensitive to the common causes of lateral variations in the wavelet (i.e., fault displacement or stratigraphic variations). Thus, the subject invention encompasses a process, devices on which the process is recorded in the form of computer instructions, the product (e.g., a map) of that process, and the manner in which such a product is used in the exploration of gas and oil.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. For example, the seismic traces have been depicted as having equal spacing. Unevenly spaced traces (See FIG. 10C) may be conveniently converted into even spacing by interpretation. As another example, it may be useful to filter the traces forming the data vector to eliminate outlyers. A median filter may be used to sort the elements of each data vector. Edge cutoffs may be used to achieve further smoothing.

Moreover, other algorithms may be used to measure the similarity of nearby regions of seismic data or to generate the "coherence cube." The coherency value or seismic attribute of equation (2) serves as a rather robust estimate or measure of signal discontinuity within geologic formations as well as signal discontinuities across faults and erosional unconformities. Other combinations of the eigenvalues of the covariance matrix are suggested (e.g., arithmetic mean, root mean square, average, median, square root of the sum of the squares, square root of the product of the squares, minimum, maximum, sum, product, etc.). Moreover, the process of the invention may be combined with other attributes (e.g., AVO slope, etc.) and also applied to multicomponent seismic data.

Also certain features of the invention may be used independently of other features of the invention. For example, geologic features identified in accordance with the present invention can be overlayed with a velocity map to provide a means of cross checking the velocities.

In addition, while coherence slice maps by themselves are very powerful mapping tools, when used in conjunction with reconnaissance mapping of amplitudes and dip maps, there is promise of a technological milestone in mapping effectiveness for the Gulf of Mexico or similar basins with 3-D seismic data readily available. It is believed that detailed mapping of structure and stratigraphy will be accelerated by mapping in a map view and less by traditional line by line picking. Interpretation in a map view of "reconnaissance" data offers significant improvement in quality and quantity of interpretation. Moreover, the process of the invention is inherently fast. Such speed aids in rapidly making bidding choices when concessions become available.

Finally, it should also be understood that the principle of the invention should be equally applicable to other fields (e.g., passive sonar, in which case the sensors would be acoustic and the signal sources could be hostile submarines; earthquake and nuclear weapon detonation detection systems, in which case the sensors would be seismic and the signal sources could be earthquake or explosion epicenters; astronomical interferometry, wherein the sensors would be radiotelescopes and the signal sources could be distant galaxies or quasars; and phased-array radars in which case the sensors would be the array antennae) wherein signals (e.g., radar, sonar, radio frequency energy, etc.) are processed to form images or locate changes in the structure represented by such images.

Thus, it will be appreciated that various modifications, alternatives, variations, and changes may be made without departing from the spirit and scope of the invention as defined in the appended claims. It is, of course, intended to cover by the appended claims all such modifications involved within the scope of the claims.

I claim:

1. A method for the exploration of hydrocarbons, comprising the steps of:
    a) obtaining a set of seismic traces distributed over a pre-determined three-dimensional volume of the earth;
    b) dividing said three-dimensional volume into a plurality of vertically stacked and generally spaced apart horizontal time layers and arranging said time layers into a plurality of cells that extend laterally and vertically, each of said time layers having portions of at least two seismic traces located therein that define a data vector;
    c) calculating in each of said time layers of said cells the outer-product of said data vector;
    d) combining said outer products to obtain a covariance matrix for each of said cells;
    e) computing in each of said cells a measure of the coherency of said seismic traces, wherein said measure of coherency is at least a function of the largest eigenvalue of said covariance matrix and at least a partial sum of the diagonal elements of said covariance matrix; and
    f) forming a seismic attribute map from a plurality of said measures of coherency of said seismic traces.

2. The method of claim 1, where in step (f) said map is formed by displaying said measures of coherency relative to a surface passing through a pre-determined seismic horizon.

3. The method of claim 1, where in step (f) said map is formed by displaying said measures of coherency relative to a surface passing through a pre-determined time line.

4. The method of claim 1, where in step (b) said cells have portions of at least five seismic traces located therein; and where in performing step (c) each outer product is in the form of at least a 5 by 5 matrix.

5. The method of claim 4, where in step (b) said cells have portions of at least nine seismic traces located therein; and wherein said data vectors have at least nine elements.

6. The method of claim 5, where in step (b) said nine seismic traces are arranged into a three by three grid.

7. The method of claim 1, where in step (b) said cells are less than 100 milliseconds in thickness.

8. The method of claim 1, wherein step (c) is performed in the time domain.

9. A method for the exploration of hydrocarbons, comprising the steps of:
    a) obtaining a set of seismic traces distributed over a pre-determined three-dimensional volume of the earth;
    b) dividing said three-dimensional volume into a plurality of vertically stacked and generally spaced apart horizontal time layers and arranging at least one of said time layers into a plurality of cells, each of said cells having portions of at least two seismic traces located therein that define a data vector;
    c) calculating in said cells the outer-product of said data vectors;
    d) combining said outer products to obtain a covariance matrix for said cells;
    e) computing in each of said cells a measure of the coherency of said seismic traces by:
        computing the largest eigenvalue of said covariance matrix,
        computing a sum of at least two of the eigenvalues of said covariance matrix, and
        computing the ratio of said largest eigenvalue to said sum of eigenvalues of said covariance matrix; and
    f) forming a seismic attribute map from a plurality of said measures of coherency of said seismic traces of said cells of said at least one time layer.

10. The method of claim 9, wherein said sum of at least two of the eigenvalues of said covariance matrix is computed by forming the sum of the diagonal elements of said covariance matrix.

11. The method of claim 9, where in performing step (b) at least one of said two seismic traces in each cell is located in an adjacent cell, such that said cells spatially overlap one another.

12. A method of locating subterranean features, faults, and contours, comprising the steps of:
    a) acquiring 3-D seismic data covering a pre-determined volume of the earth, said data comprising seismic traces characterized by time, position and amplitude;
    b) dividing at least a portion of said volume into at least one array of relatively small, adjacent, overlapping, three-dimensional analysis cubes, wherein each of said analysis cubes contains at least three laterally separated seismic traces, and dividing each analysis cube into a plurality of sample intervals such that each sample interval defines a plurality of one by three data vectors;
    c) computing a seismic attribute for each said cube that is a function of the dominant eigenvalue of a covariance matrix formed from outer products of said data vectors, and that is a function of a sum of the diagonal elements of said covariance matrix; and
    d) storing said seismic attributes of said analysis cubes for display in the form of a two-dimensional map of subterranean features.

13. A method of locating subterranean features, faults, and contours, comprising the steps of:
    a) acquiring 3-D seismic data covering a pre-determined volume of the earth, said data comprising seismic traces characterized by time, position and amplitude;
    b) dividing at least a Portion of said volume into at least one array of relatively small, adjacent, overlapping, three-dimensional analysis cells, wherein each of said analysis cells contains at least three laterally separated seismic traces, and dividing each analysis cell into a plurality of sample intervals such that each sample interval defines a plurality of one by three data vectors;

c) computing for each cell a seismic attribute that is a function of the ratio of at least the dominant eigenvalue of a covariance matrix formed from outer products of said data vectors to a sum of at least two of the eigenvalues of said covariance matrix of said cell; and d) storing said seismic attributes of said analysis cells for display in the form of at least a two-dimensional map of subterranean features.

14. The method of claim 13, where in step (c) said seismic attribute is computed by obtaining the ratio of said dominant eigenvalue to the sum of all the diagonal elements of said covariance matrix.

15. The method of claim 13, where said seismic attribute is assigned to the center of its analysis cell.

16. The method of claim 15, wherein step (b) is performed on a plurality of time slices, and further including the step of:

e) displaying said seismic attributes of successive time slices passing through said centers of said analysis cubes, to identify relative space and time invariant features.

17. In seismic exploration wherein 3-D seismic data comprising reflected seismic energy is recorded as a function of time to produce a series of seismic traces, and wherein a computer is used that is adapted to process such seismic traces, an article of manufacture comprising:

a medium that is readable by a computer and that carries instructions for said computer to perform a process comprising the steps of:
 (a) accessing 3-D seismic data over a predetermined volume, said data comprising seismic signal vectors characterized by time, position and amplitude; and
 (b) ascertaining the similarity of nearby regions of said 3-D seismic data of said volume by:
  (1) dividing at least a portion of said data into an array of relatively small, adjacent, overlapping, three-dimensional analysis cubes, wherein each of said analysis cubes contains at least two data vectors; and
  (2) computing a seismic attribute for each cube that is a function of the principal eigenvalue of a covariance matrix that is formed from a sum of outer products of said vectors of said cube and that is a function of a sum of the diagonal elements of said covariance matrix.

18. In seismic exploration wherein 3-D seismic data comprising reflected seismic energy is recorded as a function of time to produce a series of seismic traces, and wherein a computer is used that is adapted to process such seismic traces, an article of manufacture comprising:

a medium that is readable by a computer and that carries instructions for said computer to perform a process comprising the steps of:
 (a) accessing 3-D seismic data over a predetermined volume, said data comprising seismic signal vectors characterized at least by time, position and amplitude; and
 (b) ascertaining the similarity of nearby regions of said 3-D seismic data of said volume by:
  (1) dividing at least a portion of said data into an array of relatively small, adjacent, overlapping, three-dimensional analysis cells, wherein each of said analysis cells contains at least two data vectors; and
  (2) computing a seismic attribute for each cell that is representative of the ratio of the principal eigenvalue to a sum of eigenvalues of a covariance matrix formed from outer products of said data vectors of said cell.

19. In seismic exploration wherein 3-D seismic data comprising reflected seismic energy is recorded as a function of time to produce a series of seismic traces, and wherein a computer is used that is adapted to process such seismic traces, an article of manufacture comprising:

a medium that is readable by a computer and that carries instructions for said computer to perform a process comprising the steps of:
 (a) accessing 3-D seismic data over a predetermined volume, said data comprising seismic signal vectors characterized by time, position and amplitude; and
 (b) ascertaining the similarity of nearby regions of said 3-D seismic data of said volume by:
  (1) dividing at least a portion of said data into an array of relatively small, adjacent, overlapping, three-dimensional analysis cells, wherein each of said analysis cells contains at least two data vectors; and
  (2) computing a seismic attribute for each cell that is representative of the ratio of the principal eigenvalue to a sum of the diagonal elements of a covariance matrix formed from outer products of said data vectors of said cell.

20. The article of manufacture of claim 18, wherein said medium carries instructions for said computer to perform step (1) by forming analysis cells having a generally rectangular array of least five seismic traces located therein; and wherein said covariance matrix is at least a five by five matrix and is formed from at least three outer product matrices.

21. The article of manufacture of claim 20, wherein said medium carries instructions for said computer to assign said seismic attributes to the center of its analysis cell.

22. In seismic exploration wherein reflected seismic energy is recorded as a function of time to produce a series of seismic traces, a method comprising the steps of:

(a) determining the outer-product of two data vectors formed from at least two seismic traces;

(b) forming a covariance matrix by adding said outer-products of step (a);

(c) computing a seismic attribute that is an independent function of at least the principal eigenvalue of said covariance matrix of step (b);

(d) repeating steps (a) through (c) across at least a part of at least one time window; and (e) forming a map of said seismic attributes over said time window.

23. In seismic exploration wherein reflected seismic energy is recorded as a function of time to produce a series of seismic traces, a method comprising the steps of:

(a) determining the outer-product of two data vectors formed from at least two seismic traces;

(b) forming a covariance matrix by adding said outer-products of step (a);

(c) computing a seismic attribute that is a function of at least the ratio of a principal eigenvalue to at least a partial sum of the eigenvalues of said covariance matrix;

(d) repeating steps (a) through (c) across at least a part of at least one time window; and (e) forming a map of said seismic attributes over said time window.

24. In seismic exploration wherein reflected seismic energy is recorded as a function of time to produce a series of seismic traces, a method comprising the steps of:

(a) determining the outer-product of two data vectors formed from at least two seismic traces;

(b) forming a covariance matrix by adding said outer-products of step (a);

(c) computing a seismic attribute that is a function of at least the ratio of a principal eigenvalue to at least a partial sum of the diagonal elements of said covariance matrix;

(d) repeating steps (a) through (c) across at least a part of at least one time window; and (e) forming a map of said seismic attributes over said time window.

25. The method of claim 23, wherein step (d) is performed by using at least one seismic trace from the previous performance of step (a) and at least two new seismic traces that are located adjacent to said at least one seismic trace.

26. In seismic exploration wherein reflected seismic energy is recorded as a function of time to produce a series of seismic traces, a method comprising the steps of:

(a) determining the outer-product of two data vectors formed from at least two seismic traces by performing at least the following steps:
  (1) accessing 3-D seismic data over a predetermined volume of the earth, said 3-D seismic data seismic traces characterized at least by time, position and amplitude; and
  (2) dividing a portion of said volume into at least one time window comprising an array of relatively small, overlapping, three-dimensional analysis cells that contain said at least two seismic traces;

(b) forming a covariance matrix by adding said outer-products of step (a);

(c) computing a seismic attribute that is a function of at least the principal eigenvalue of said covariance matrix of step (b);

(d) repeating steps (a) through (c) across at least a part of at least one time window; and (e) forming a map of said seismic attributes over said time window.

27. A method of seismic exploration, comprising the steps of:

a) reading a 3-D seismic data set comprising seismic signal traces distributed over a volume of the earth;

b) selecting at least one horizon slice from said volume and forming thereon cells that are arranged into laterally extending rows and columns, each of said cells comprising at least three seismic traces extending generally therethrough;

c) computing for each of said cells:
  (1) the outer-product of data vectors defined by a plurality of time intervals on each side of the center said cell;
  (2) a covariance matrix from said outer products of step (1);
  (3) the largest eigenvalue of said covariance matrix;
  (4) the numerical trace of said covariance matrix; and
  (5) a linear function of said largest eigenvalue and said numerical trace; and d) examining said first order function of said cells along said at least one horizon slice.

28. A method of seismic exploration, comprising the steps of:

a) reading a 3-D seismic data set comprising seismic signal traces distributed over a volume of the earth; and forming thereon cells that are arranged into laterally extending rows and columns, each of said cells comprising at least portions of at least three seismic traces extending generally therethrough;

b) selecting at least one plane passing through said volume;

c) computing for each of said cells:
  (1) the outer-product of data vectors defined by said portions of said seismic traces;
  (2) a covariance matrix from said outer products of step (1); and
  (3) at least the largest eigenvalue of said covariance matrix; and d) displaying a representation of at least said largest eigenvalues of said cells across said at least one plane passing through said volume.

29. The method of claim 28, wherein said representation is a function of said largest eigenvalue of each cell and a sum of the eigenvalues of said covariance matrix of said cell.

30. In seismic exploration wherein reflected seismic energy is recorded as a function of time to produce a series of seismic traces, a method comprising the steps of:

(a) arranging 3-D seismic data into relatively small, overlapping, three-dimensional analysis cubes that contain a plurality of seismic traces;

(b) determining the outer-product of the data vectors defined by said analysis cubes;

(c) forming a covariance matrix for each cube by adding said outer-products of step (b);

(d) computing a seismic attribute that is a function of the ratio of the principal eigenvalue of each covariance matrix to the numerical trace of that covariance matrix; and (e) arranging said seismic attributes for being displayed as a map.

31. A device, comprising:

computer readable means carrying instructions for a process comprising the steps of:
  (1) reading into memory 3-D seismic data that covers a pre-determined volume of the earth;
  (2) digitally sorting said 3-D seismic data into an array of relatively small three-dimensional cells wherein each of said cells contains at least a portion of at least three seismic traces;
  (3) calculating in each said cells a coherency value from a linear function of the largest of the eigenvalues of a covariance matrix that is formed from a plurality of outer products of said at least three traces; and
  (4) storing said coherency values of said cells for displaying same in the form of two-dimensional map of subterranean features represented by said coherency values.

32. The device of claim 31, where in step (3) said coherency value is at least a function of the largest of said eigenvalues of said covariance matrix.

33. The device of claim 31, wherein said coherency value is a first order function of said largest eigenvalue and a sum of said eigenvalues.

34. The device of claim 31, wherein said computer-readable means is selected from the group consisting of a magnetic tape, a magnetic disk, an optical disk and a CD-ROM.

35. A method of locating subterranean features, faults, and contours, comprising the steps of:
   a) obtaining seismic data covering a pre-determined volume of the earth;
   b) dividing said volume into an array of relatively small three-dimensional cells wherein each of said cells is characterized by at least two seismic data vectors located therein;
   c) computing a covariance matrix from the outer products of said data vectors
   d) mapping a representation of a linear function of the eigenvalues of said covariance matrix.

36. A method of locating subterranean features, faults, and contours, comprising the steps of:
   a) obtaining seismic data covering a pre-determined volume of the earth;
   b) dividing said volume into an array of relatively small three-dimensional cells wherein each of said cells is characterized by at least two seismic data vectors located therein;
   c) computing a covariance matrix from said data vectors of said cells, wherein the elements of said covariance matrix are formed from adding a plurality of outer products; and
   d) mapping a linear function of the eigenvalues of said covariance matrix.

37. The method of claim 36, wherein step (d) is performed by mapping the ratio of the largest eigenvalue to a sum of eigenvalues.

38. A method of prospecting for hydrocarbon deposits, comprising the steps of:
   a) obtaining a seismic attribute map of coherency values of 3-D seismic data for a pre-determined three-dimensional volume of the earth, said map being generated by using a computer and a program for said computer that instructs said computer to perform the following steps:
      (1) reading said data and sorting said volume into an array of relatively small three-dimensional cells, wherein each of said cells has at least two seismic data vectors located therein; and
      (2) calculating in each of said cells a coherency value for said seismic traces that is a linear function of the largest of the eigenvalues of a covariance matrix formed from outer products of said data vectors and that is a function of the numerical trace of said covariance matrix; and
   (b) using said map to identify subsurface structural and sedimentological features commonly associated with the entrapment and storage of hydrocarbons.

39. A method of prospecting for hydrocarbon deposits, comprising the steps of:
   a) obtaining a seismic attribute map of coherency values of 3-D seismic data for a pre-determined three-dimensional volume of the earth, said map being generated by using a computer and a program for said computer that instructs said computer to perform the following steps:
      (1) reading said data and sorting said volume into an array of relatively small three-dimensional cells, wherein each of said cells has at least two seismic data vectors located therein; and
      (2) calculating in each of said cells a coherency value for said seismic traces that is a function of the eigenvalues of a covariance matrix formed from outer products of said data vectors; and
   (b) using said map to identify: subsurface structural and sedimentological features commonly associated with the entrapment and storage of hydrocarbons, and drilling hazards.

40. The method of claim 39, further including the step of drilling at a location identified in step (b).

41. The method of claim 39, wherein said program instructs said computer to perform step (a)(2) by:
   (i) computing the largest eigenvalue of each covariance matrix and at least a partial sum of the eigenvalues of said covariance matrix; and
   (ii) computing the ratio of said largest eigenvalue to said sum.

42. The method of claim 41, where in performing step (i) said program instructs said computer to compute said sum of eigenvalues by calculating the sum of the diagonal elements of said covariance matrix.

43. A computer workstation for use in the exploration of oil and gas, comprising:
   a digital computer,
   a memory,
   means for converting numerical values that are representatives of seismic data and that are read into said memory into a visual display, and
   a medium readable by the computer and containing a representation of a coherency cube, said coherency cube comprising measurements of the coherency of 3D seismic data, each of said measurements being a linear and an independent function of the eigenvalues of a covariance matrix formed from adding at least two outer products of at least two seismic data vectors.

44. The workstation of claim 43, wherein said data vectors are characterized by space and time coordinates; and wherein said measurements of coherency are assigned to said space and time coordinates.

45. The workstation of claim 44, wherein each of said measurements is at least a linear function of the dominant eigenvalue of the respective covariance matrix.

46. The workstation of claim 45, wherein each of said measurements is also a linear function of a sum of eigenvalues.

47. The workstation of claim 45, wherein each of said measurements is also a linear function of the numerical trace of said cova an matrix.

48. The workstation of claim 45, wherein each of said measurements is a linear function of the ratio of said dominant eigenvalue to the numerical trace of said covariance matrix.

* * * * *

UNITED STATES PATENT AND TRADEMARK OFFICE
CERTIFICATE OF CORRECTION

PATENT NO. : 5,892,732
DATED : Apr. 6, 1999
INVENTOR(S) : Adam Gersztenkorn

It is certified that error appears in the above-indentified patent and that said Letters Patent is hereby corrected as shown below:

| Col. | Line | |
|---|---|---|
| 6 | 5 | "where $\lambda_1$ are the eigenvalues"<br><br>should read:<br>"where $\lambda_i$ are the eigenvalues" |
| 6 | 26 | "accross the entire 3-D"<br><br>should read:<br>"across the entire 3-D" |
| 7 | 53 | "In other locations mud"<br><br>should read:<br>"In other locations, mud" |
| 10 | 66 | "at least a Portion"<br><br>should read:<br>"at least a portion" |
| 11 | 5 | "three data vectors: |

UNITED STATES PATENT AND TRADEMARK OFFICE
CERTIFICATE OF CORRECTION

PATENT NO. : 5,892,732
DATED : Apr. 6, 1999
INVENTOR(S) : Adam Gersztenkorn

It is certified that error appears in the above-indentified patent and that said Letters Patent is hereby corrected as shown below:

| Col. | Line | |
|---|---|---|
| | | should read:<br>"three data vectors;" |
| 14 | 53 | "each said cells"<br><br>should read:<br>"each of said cells" |
| 15 | 14 | "said data vectors"<br><br>should read:<br>"said data vectors;" |
| 16 | 56 | "said cova an matrix."<br><br>should read:<br>"said covariance matrix" |

Signed and Sealed this

Ninth Day of November, 1999

Q. TODD DICKINSON

*Attest:*

*Attesting Officer*  Acting Commissioner of Patents and Trademarks